(12) United States Patent
Singh

(10) Patent No.: US 12,380,203 B2
(45) Date of Patent: Aug. 5, 2025

(54) REDIRECTION OF ATTACHMENTS BASED ON RISK AND CONTEXT

(71) Applicant: Citrix Systems, Inc., Ft. Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 312 days.

(21) Appl. No.: 17/363,631

(22) Filed: Jun. 30, 2021

(65) Prior Publication Data
US 2023/0004638 A1  Jan. 5, 2023

(51) Int. Cl.
*G06F 21/53* (2013.01)
*G06F 21/57* (2013.01)
*H04L 51/08* (2022.01)

(52) U.S. Cl.
CPC .............. *G06F 21/53* (2013.01); *G06F 21/57* (2013.01); *H04L 51/08* (2013.01)

(58) Field of Classification Search
CPC ........ G06F 21/53; G06F 21/57; G06F 21/562; H04L 51/08; H04L 51/212; H04L 63/0236; H04L 63/1433
See application file for complete search history.

(56) References Cited

U.S. PATENT DOCUMENTS

| | | | | |
|---|---|---|---|---|
| 11,089,061 | B1 * | 8/2021 | Sinha | H04L 51/212 |
| 2002/0019941 | A1 | 2/2002 | Chan et al. | |
| 2007/0079379 | A1 * | 4/2007 | Sprosts | H04L 63/145 726/24 |
| 2010/0192224 | A1 * | 7/2010 | Ferri | G06F 21/53 726/23 |
| 2011/0099609 | A1 | 4/2011 | Malhotra et al. | |
| 2015/0264111 | A1 * | 9/2015 | Aleksandrov | H04L 51/08 726/4 |
| 2016/0224202 | A1 * | 8/2016 | Moskalev | G06F 3/03543 |
| 2016/0234249 | A1 * | 8/2016 | Wong | H04L 63/101 |
| 2017/0011220 | A1 * | 1/2017 | Efremov | G06F 21/604 |
| 2018/0054447 | A1 * | 2/2018 | Greevy | H04L 51/212 |
| 2018/0167479 | A1 * | 6/2018 | Bostick | H04L 67/141 |

(Continued)

FOREIGN PATENT DOCUMENTS

GB  2561861 A1  10/2018

OTHER PUBLICATIONS

"Get attachments of an Outlook item from the server," (Jan. 14, 2021), accessed from Internet at: https://docs.microsoft.com/en-us/office/dev/add-ins/outlook/get-attachments-of-an-outlook-item/ 10 pages.

(Continued)

*Primary Examiner* — Farid Homayounmehr
*Assistant Examiner* — Suman Debnath

(57) ABSTRACT

A computer system is provided. The computer system includes a memory and at least one processor coupled to the memory and configured to evaluate a risk associated with an email attachment based on application of security policies to properties of the attachment and to the context associated with receipt of the email. The at least one processor is further configured to detect an attempt by a user to open the email attachment. The at least one processor is further configured to prevent the opening of the attachment based on the evaluated risk. The at least one processor is further configured to redirect the attachment to a secure browser, hosted on a remote server, based on the evaluated risk.

20 Claims, 8 Drawing Sheets

(56) References Cited

U.S. PATENT DOCUMENTS

| | | | |
|---|---|---|---|
| 2019/0213325 A1 | 7/2019 | McKerchar et al. | |
| 2020/0355798 A1* | 11/2020 | Schaller | G02B 26/0816 |
| 2021/0266294 A1* | 8/2021 | Chechik | H04L 51/222 |
| 2022/0342981 A1* | 10/2022 | Wing | G06F 21/606 |
| 2023/0367836 A1* | 11/2023 | Sundberg | G06F 9/452 |

OTHER PUBLICATIONS

International Search Report and Written Opinion for International Application No. PCT/US2022/033790, Date of Mailing Sep. 20, 2022 (11 pages).

* cited by examiner

REDIRECTION OF ATTACHMENTS BASED ON RISK AND CONTEXT

BACKGROUND

Cyber security is an issue of great importance, as attacks on computer systems and the users of those systems continue to increase. One of the most prevalent, and often most successful, forms of attack involve the delivery of an email attachment that contains a virus or other malicious code. The attachment, when opened, can disable a computer, steal confidential information, perform unauthorized actions, or subject the user to ransomware demands. Such malicious emails can appear to be legitimate and are often successful at fooling the user into opening the attachment.

SUMMARY

In at least one example, a computer system is provided. The computer system includes a memory; and at least one processor coupled to the memory and configured to: evaluate a risk associated with an attachment of an email based on application of security policies to properties of the attachment and to context associated with receipt of the email; detect an attempt to open the attachment; prevent opening of the attachment based on the evaluated risk; and redirect the attachment to a secure browser based on the evaluated risk.

At least some examples of the computer system can include one or more of the following features. The properties of the attachment include one or more of an address of a sender of the attachment, a domain name associated with the sender, and a type of file associated with the attachment. The at least one processor is further configured to check employment status of the sender of the email, wherein the properties of the attachment further include the employment status. The context includes one or more of a type of network over which the computer system receives the email, a version status of an application to be used to open the attachment, and a risk score associated with a sender of the email. The type of network includes one or more of a public network, a private network, a wired network, a Wi-Fi network, and a cellular network. The at least one processor is further configured to employ an event handler callback to detect a mouse click or keyboard entry focused on the attachment to detect the attempt to open the attachment. The computer system further comprises a remote server, wherein the secure browser is hosted on the remote server and configured to open the attachment in an anonymous session.

In at least one example, a method for redirection of an email attachment is provided. The method includes evaluating, by a computer system, a risk associated with an attachment of the email based on application of security policies to properties of the attachment and to context associated with receipt of the email; detect, by the computer system, an attempt to open the attachment; preventing, by the computer system, opening of the attachment based on the evaluated risk; and redirecting, by the computer system, the attachment to a secure browser based on the evaluated risk.

At least some examples of the method can include one or more of the following features. Evaluating the risk comprises evaluating the risk associated with the email attachment based on application of the security policies to properties of the attachment including one or more of an address of a sender of the attachment, a domain name associated with the sender, and a type of file associated with the attachment. The act of checking employment status of the sender of the email, wherein the properties of the attachment further include the employment status. Evaluating the risk comprises evaluating the risk associated with the email attachment based on application of the security policies to context associated with receipt of the email including one or more of a type of network over which the computer system receives the email, a version status of an application to be used to open the attachment, and a risk score associated with a sender of the email. Evaluating the risk comprises evaluating the risk associated with the email attachment based on application of the security policies to context associated with receipt of the email including a type of network over which the computer system receives the email, wherein the type of network includes one or more of a public network, a private network, a wired network, a Wi-Fi network, and a cellular network. The act of employing an event handler callback to detect a mouse click or keyboard entry focused on the attachment to detect the attempt to open the attachment.

In at least one example, a non-transitory computer readable medium storing executable sequences of instructions to provide redirection of an email attachment. The sequences of instructions include instructions to: evaluate a risk associated with an attachment of the email based on application of security policies to properties of the attachment and to context associated with receipt of the email; detect an attempt to open the attachment; prevent opening of the attachment based on the evaluated risk; and redirect the attachment to a secure browser based on the evaluated risk.

At least some examples of the non-transitory computer readable medium can include one or more of the following features. The properties of the attachment include one or more of an address of a sender of the attachment, a domain name associated with the sender, and a type of file associated with the attachment. Instructions to check employment status of the sender of the email, wherein the properties of the attachment further include the employment status. The context includes one or more of a type of network over which the computer system receives the email, a version status of an application to be used to open the attachment, and a risk score associated with a sender of the email. The type of network includes one or more of a public network, a private network, a wired network, a Wi-Fi network, and a cellular network. Instructions to employ an event handler callback to detect a mouse click or keyboard entry focused on the attachment to detect the attempt to open the attachment. The secure browser is hosted on a remote server and configured to open the attachment in an anonymous session.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
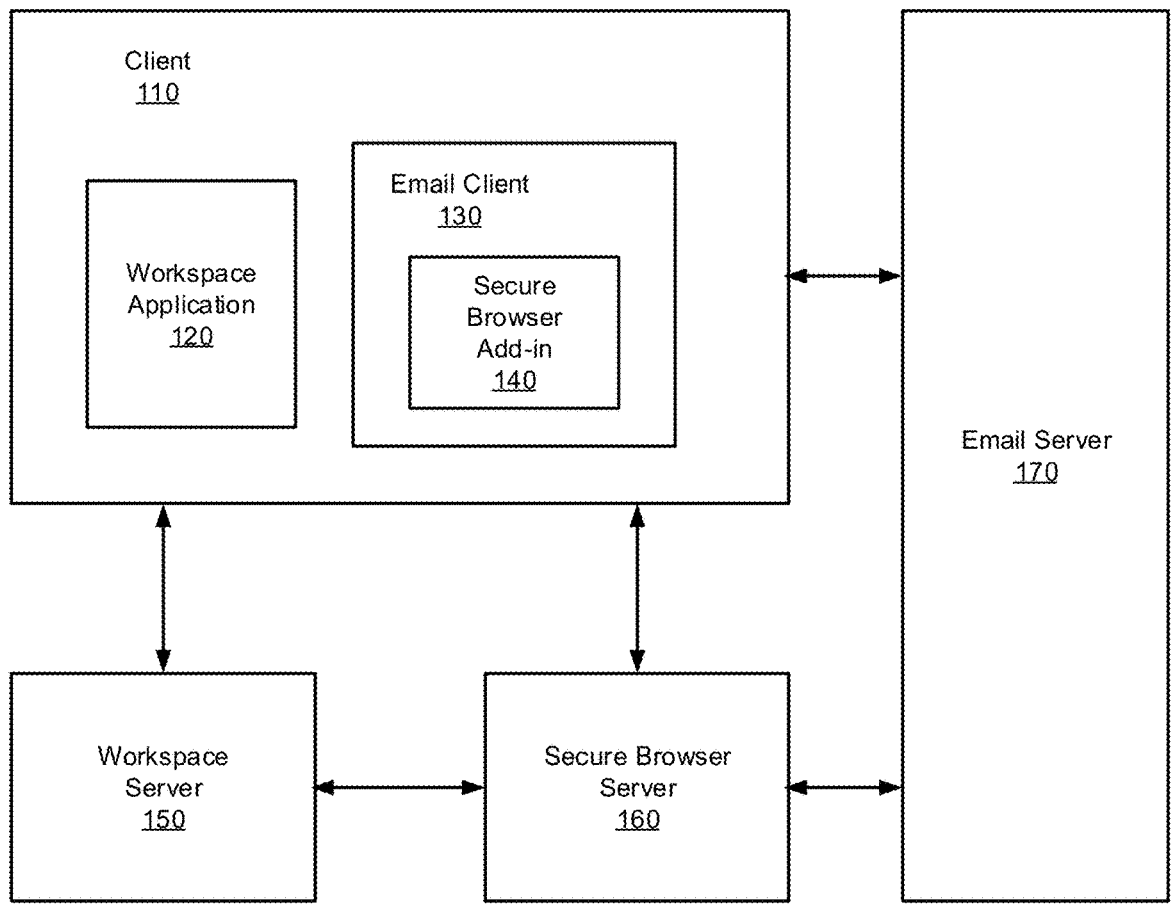
FIG. 1 is a top-level block diagram of an implementation of a system for attachment redirection, in accordance with an example of the present disclosure.

As noted previously, cyber security is a growing concern as attacks on computer systems and the users of those systems increase. One frequent method for delivering those attacks is through email attachments which contain malicious code and/or data. The attachment, when opened, can disable a computer, steal confidential information, perform unauthorized actions, or subject the user to ransomware demands. These emails can appear to be legitimate and are often successful at fooling the user into opening the attachment.

To address these and other problems, and as summarized above, various examples described herein are directed to systems and methods for redirecting high risk attachments to a remote secure browser server to prevent cyber-attacks, without requiring action on the part of the user (e.g., recipient of the email).

In some examples, the disclosed techniques provide protection against cyber-attacks by redirecting attachments from a client device to a remote secure browser server based on an evaluation of the risk and context associated with the attachment. The risk evaluation includes application of security policies to properties of the attachment and to the context in which the attachment is received by the client. If the attachment is deemed to be high risk, it can be opened by the remote secure browser in a relatively safe manner, otherwise it can be opened locally by an application on the client.

In some examples, the attachment risk may be evaluated, at least in part, by a risk score associated with the sender of the email. For example, in a corporate setting, some employees may be assigned a risk score by human resources (or some other corporate arm) based on information that is known about the employee. In some examples, an employee who is scheduled to sever their relationship with the company within a given time period (e.g., the next N days, where N is a selectable threshold) may be assigned a higher risk than other employees. In some examples, an employee may be assigned a risk score by analytics based on the employee's activity or behavior that is deemed risky such as downloading/printing a large number of sensitive files, etc.

In some examples, the address and/or domain of the sender of the email may be a factor in the risk evaluation. Certain addresses/domain names may be known to harbor bad actors. On the other hand, if the domain name of the sender matches the domain name of the recipient, that may be considered to lower the risk, in some cases.

In some examples, the type of file in the attachment (e.g., Word document, PDF, spreadsheet, image file, audio file, etc.) may be a factor in the risk evaluation. Additionally, the version of software that will be used to open the attachment file on the client device may be a contributing factor in the risk evaluation, as older or out of date versions may not have the latest security patches/updates.

In some examples, the context of the email may be evaluated as an additional factor to estimate risk. For example, an email received over a free or public Wi-FI network may be considered less secure (e.g., subject to attack by a man-in-the-middle scheme) compared to an email received over a private/corporate network. Many other examples are possible and any suitable risk factors and contexts may be considered in light of the present disclosure.

In some examples, Information Technology (IT) security policies are provided to specify which factors are considered important and how they should be evaluated. These policies may be updated over time, as threats and strategies evolve.

These systems and methods overcome a security problem in which even the most security-conscious user can be fooled into opening a malicious email attachment. For example, a user may be distracted by other workplace demands and inadvertently click on a malicious attachment. The disclosed techniques will intercept the mouse click, evaluate the context and risk score associated with the attachment, and open it in a safe manner, either locally or remotely, based on the risk evaluation.

As will be understood in view of this disclosure, the systems and methods for providing risk-based attachment redirection provided herein have advantages over existing methods which rely on user vigilance to carefully inspect each email and attachment, which is subject to lapse. For instance, the systems and methods described herein provide automated protection and do not rely on user action. Other existing methods open the attachment in a secure sandbox local to the client device, but that approach may require virtualization support and/or enablement in the Basic Input/Output System (BIOS), which is not always possible. Additionally, that approach still poses a risk since it involves local execution, and any bugs or vulnerabilities may compromise the client device.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Attachment Redirection System

FIG. 1 is a top-level block diagram of an implementation of a system 100 for attachment redirection, in accordance with an example of the present disclosure. As shown in FIG. 1, the system comprises a client 110, a workspace server 150, a secure browser server 160, and an email server 170. The client 110 (e.g., a device such as a laptop, mobile device, workstation, etc.) is configured to execute a workspace application 120 and an email client application 130. In some examples, the email client application may include a secure browser add-in 140.

The operation of system 100 will be explained in greater detail below, but at a high-level, the system is configured to evaluate risks associated with email attachments and to redirect attachments, which are deemed to be at higher risk, to a secure browser server where they can be opened in a relative safe manner. In some examples, the workspace server 150 is configured to provide secure access to virtual applications, information, and content that is to be delivered to a user of the client device 110 through the workspace application 120 that executes on the client device. Additionally, the email client 130 is configured to retrieve emails (including attachments) from the email server 170. The secure browser add-in 140 to the email client 130, working in combination with the workspace application 120 and the workspace server 150, functions to evaluate the risks associated with an attachment, block attempts by the user to open the attachment if the risk exceeds a threshold for unacceptability, and redirect the attachment to a secure browser for opening, as will be explained below. In some examples, the secure browser server may be a security hardened Linux server. In some examples, the secure browser may be a virtual desktop agent executing on the secure browser server or on another machine.

Figure 2:
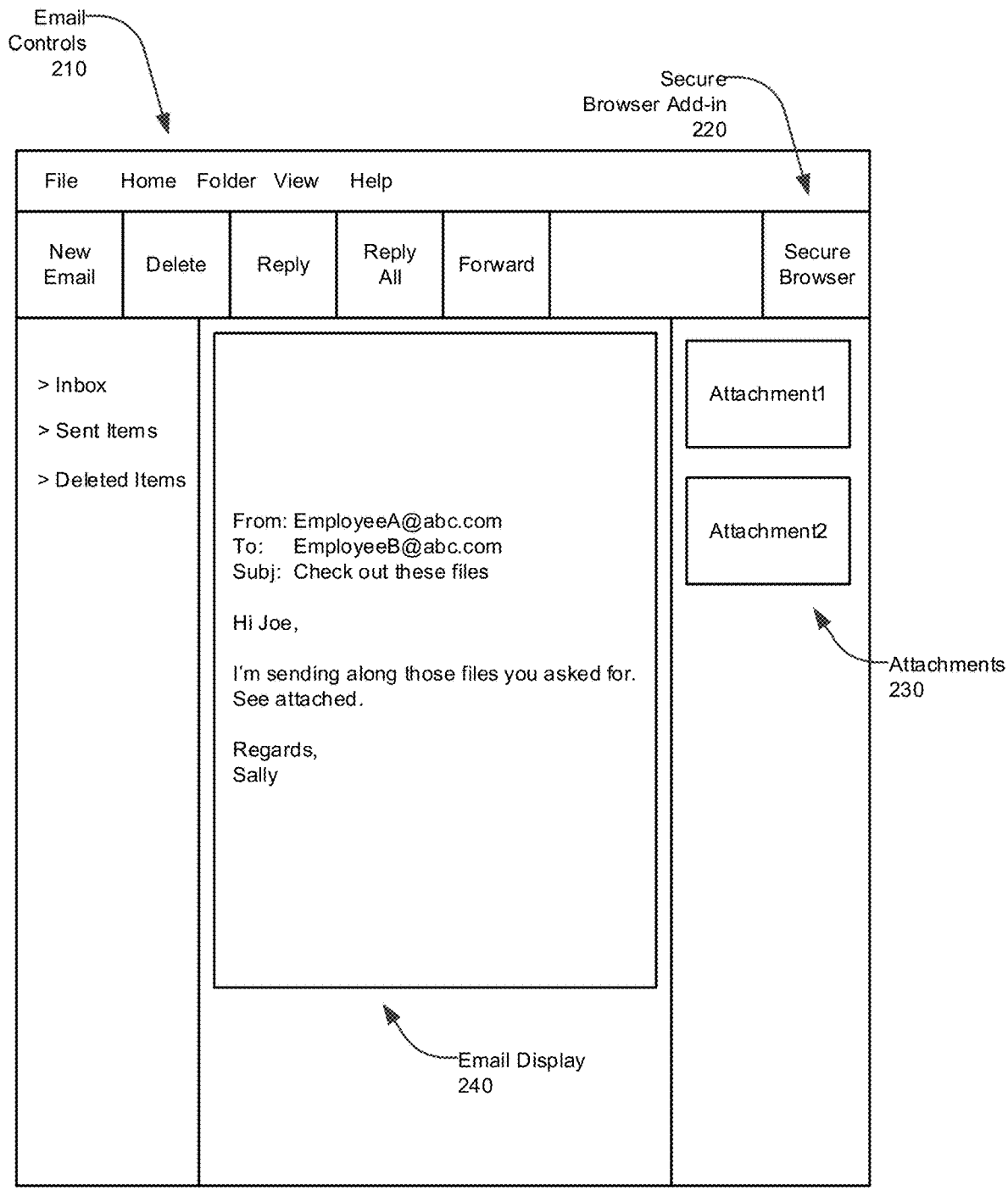
FIG. 2 illustrates an email client user interface, in accordance with an example of the present disclosure.

FIG. 2 illustrates an email client user interface 200, in accordance with an example of the present disclosure. The user interface, in this example, is shown to include a variety of email controls 210 (e.g., tabs and buttons), a secure browser add-in 220, a display of the currently open email 240, and a presentation of attachments 230 associated with the email.

The attachments may be opened by clicking on the attachment box or by other suitable means such as, for example, moving the User Interface (UI) focus to the attachment box with the tab key and then pressing the enter key. In some examples, the workspace application 120, of FIG. 1, is configured to employ UI automation to detect when the user attempts to open an attachment. UI automation is an application programming interface, provided by the operating system of the client device, which allows one application to access, identify, and manipulate the UI elements of another application. In this case, UI automation allows the workspace application 120, of FIG. 1, to control the attachments presented by the email client 130, of FIG. 1, and intercept requests by the user to open those attachments. The workspace application 120 can then evaluate risks associated with the attachments and determine whether to open the attachments locally (e.g., on the client device 110, of FIG. 1) or remotely (e.g., on the secure browser server 160, of FIG. 1), as will be explained below.

Attachment Redirection Process

As described above, some examples of the system 100 of FIG. 1 are configured to perform a process for attachment redirection to a secure browser server. The processes may be executed on a processor of any suitable type (e.g., processor 610 of FIG. 6).

Figure 3:
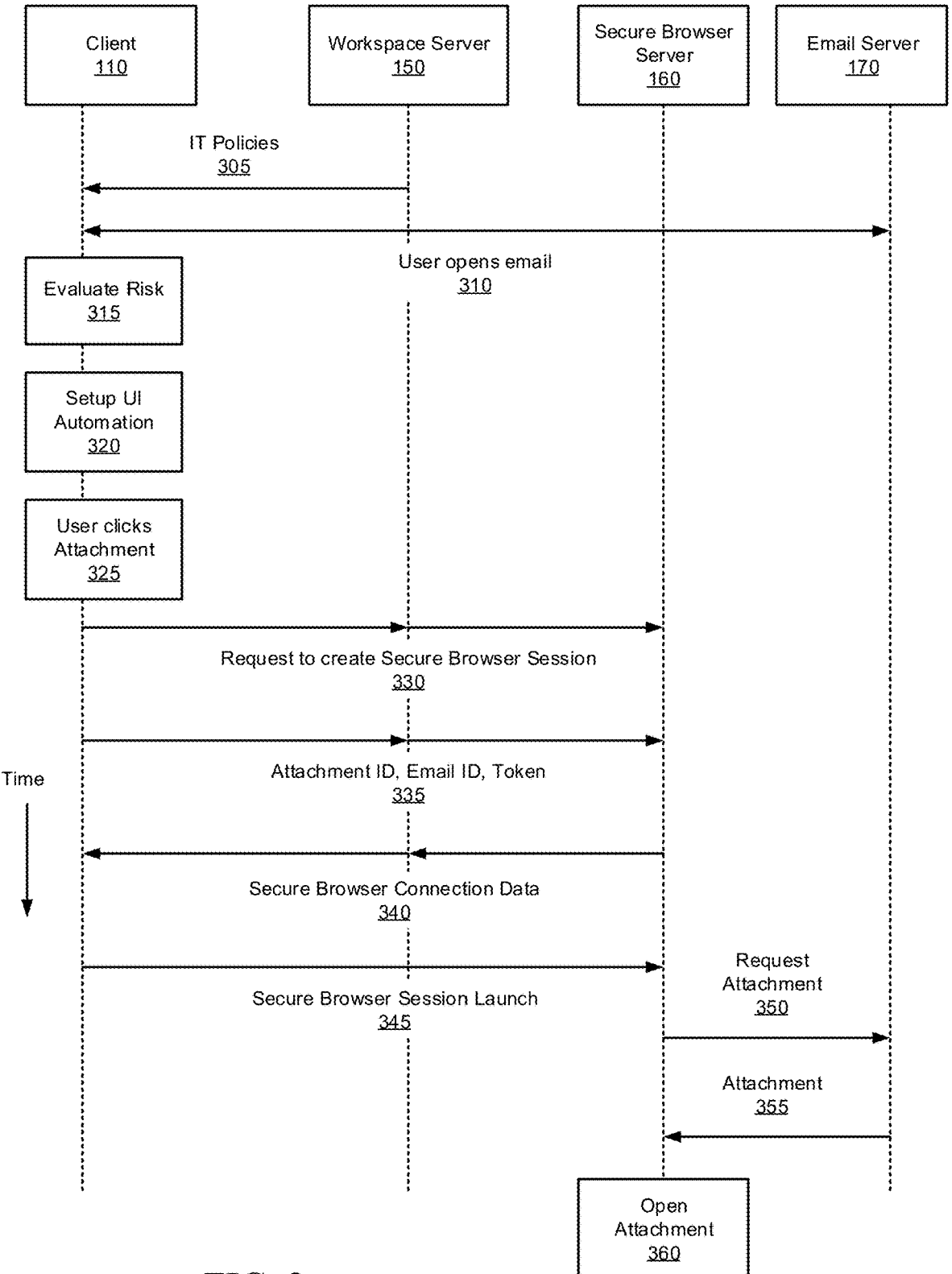
FIG. 3 is a sequence diagram of an attachment redirection process, in accordance with an example of the present disclosure.

FIG. 3 illustrates a sequence diagram 300 of an attachment redirection process, in accordance with an example of the present disclosure. The sequence diagram illustrates interactions between entities (client device 110, workspace server 150, secure browser server 160, and email server 170, of FIG. 1) in the horizontal direction, over time in the vertical direction.

At operation 305, the workspace server 150 provides IT security policies (regarding opening of email attachments) to the workspace application 120, of FIG. 1, running on the client 110. At operation 310, the user accesses and opens email from the email server 170 through the email client 130, of FIG. 1.

At operation 315, a risk evaluation is performed on the attachment. The risk evaluation is based on an application of the provided security policies to properties of the attachment and to the context associated with receipt of the email, as will be described in greater detail below.

At operation 320, UI automation techniques are set up, which provide hooks to event handlers that allow for detection of user attempts to open the attachment. At operation 325, the user attempts to open the attachment, for example by clicking on it or typing the enter key while the attachment is in focus.

At operation 330, in response to the detected attempt to open the attachment, the client 110 sends a request to the workspace server 150 to create a secure browser session. The workspace server then forwards that request to the secure browser server 160.

At operation 335, the client 110 sends an attachment ID, an email ID, an Application Programming Interface (API)/service endpoint Uniform Resource Locator (URL), and a token to the workspace server. In some examples, the API/URL provides a path into the email server 170, through which the email attachment can be fetched. In some examples, the token serves to authenticate (to the email server 170) the request for access to the attachment, providing a security mechanism to prevent access by unauthorized parties.

At operation 340, the secure browser server provides connection data to the workspace server. The workspace server then forwards that connection data to the client.

At to operation 345, the client communicates to the secure browser server, using the provided connection data, to launch a secure browser session.

At operation 350, the secure browser server 160 requests the attachment from the email server 170 (for example, by providing the token), and at operation 355, the email server provides the attachment to the secure browser server.

At operation 360, the secure browser server opens the attachment in a secure anonymous session.

Figure 4A:
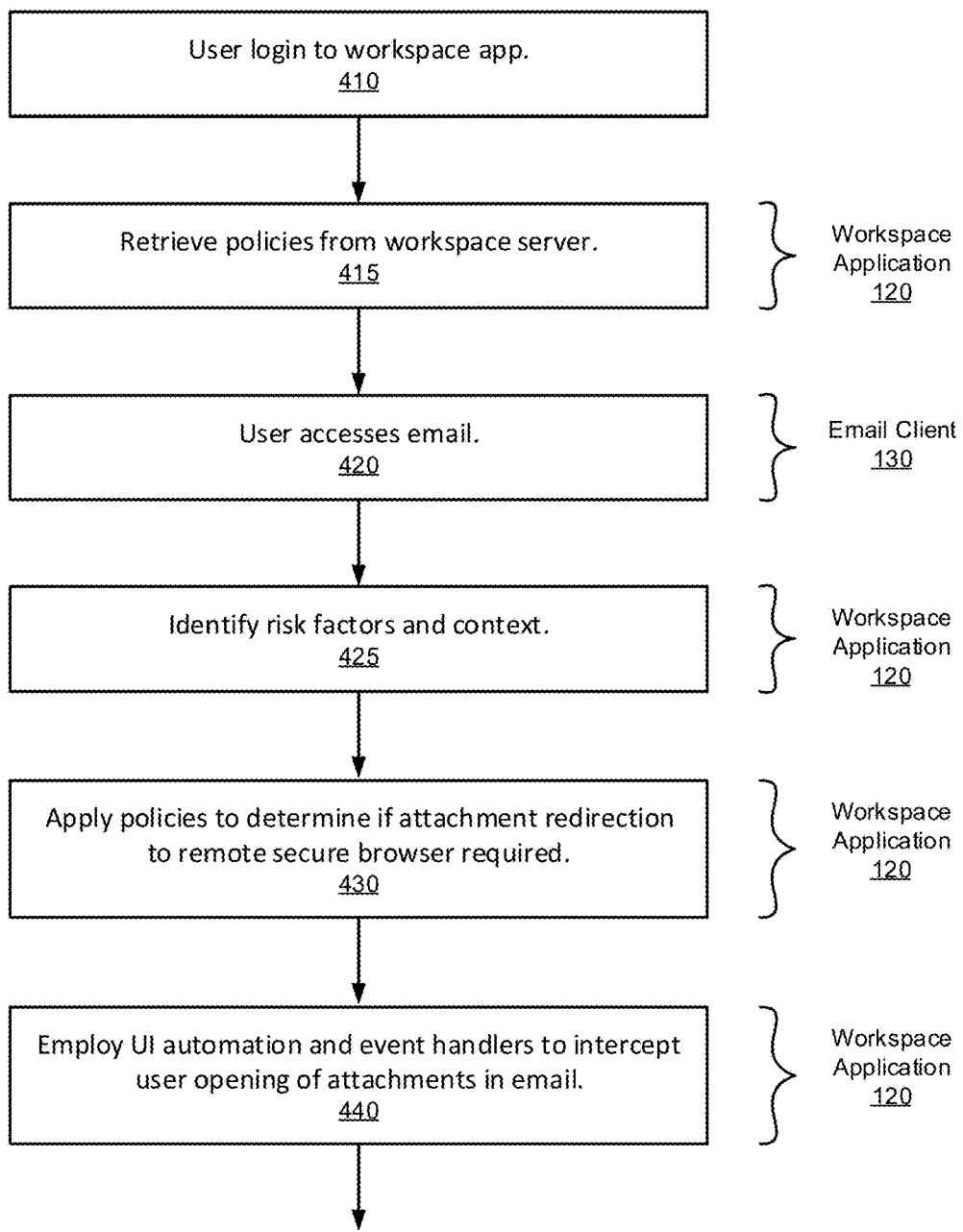
FIGS. 4A-4C are a flow diagram of a process for attachment redirection, in accordance with an example of the present disclosure.
Figure 4B:
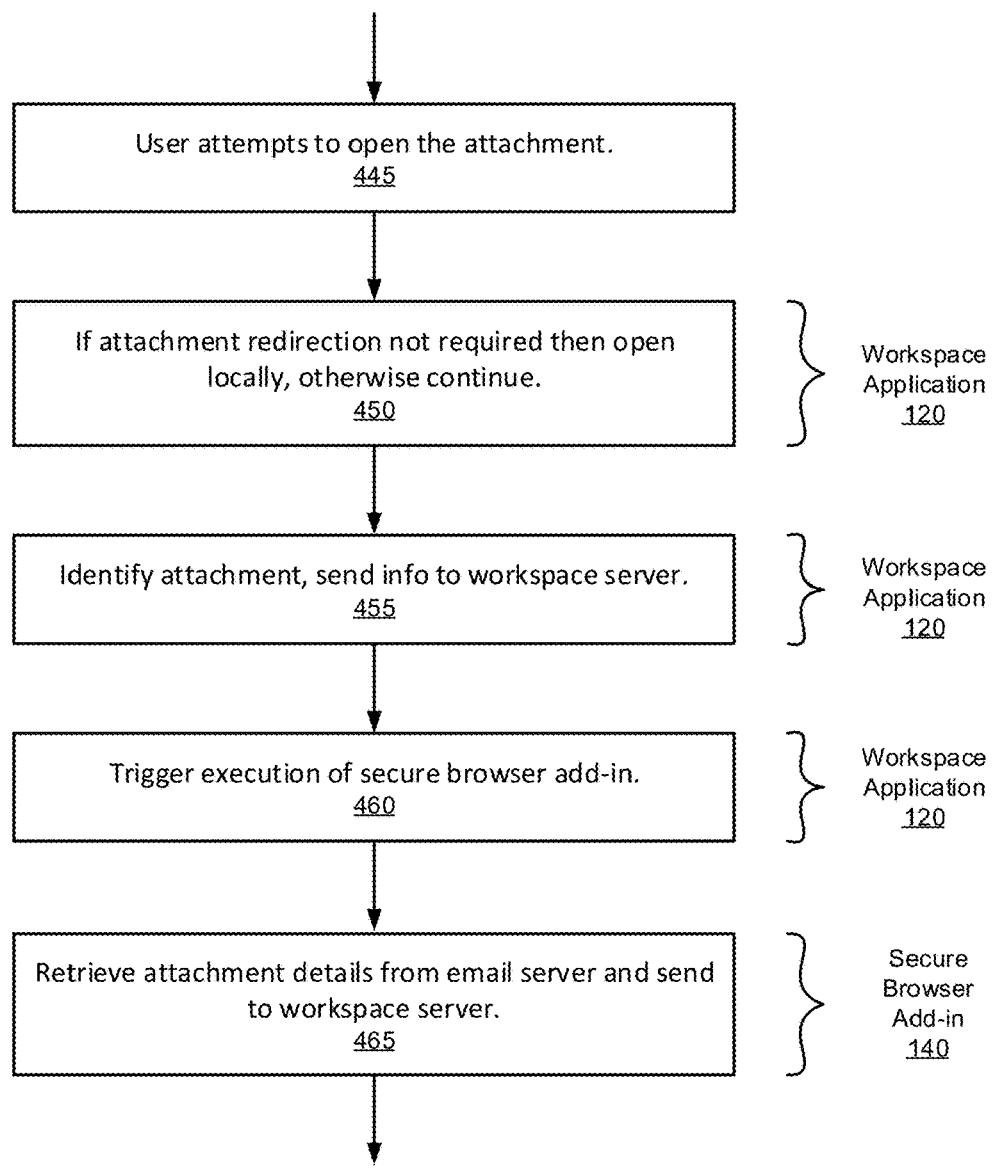
Figure 4C:
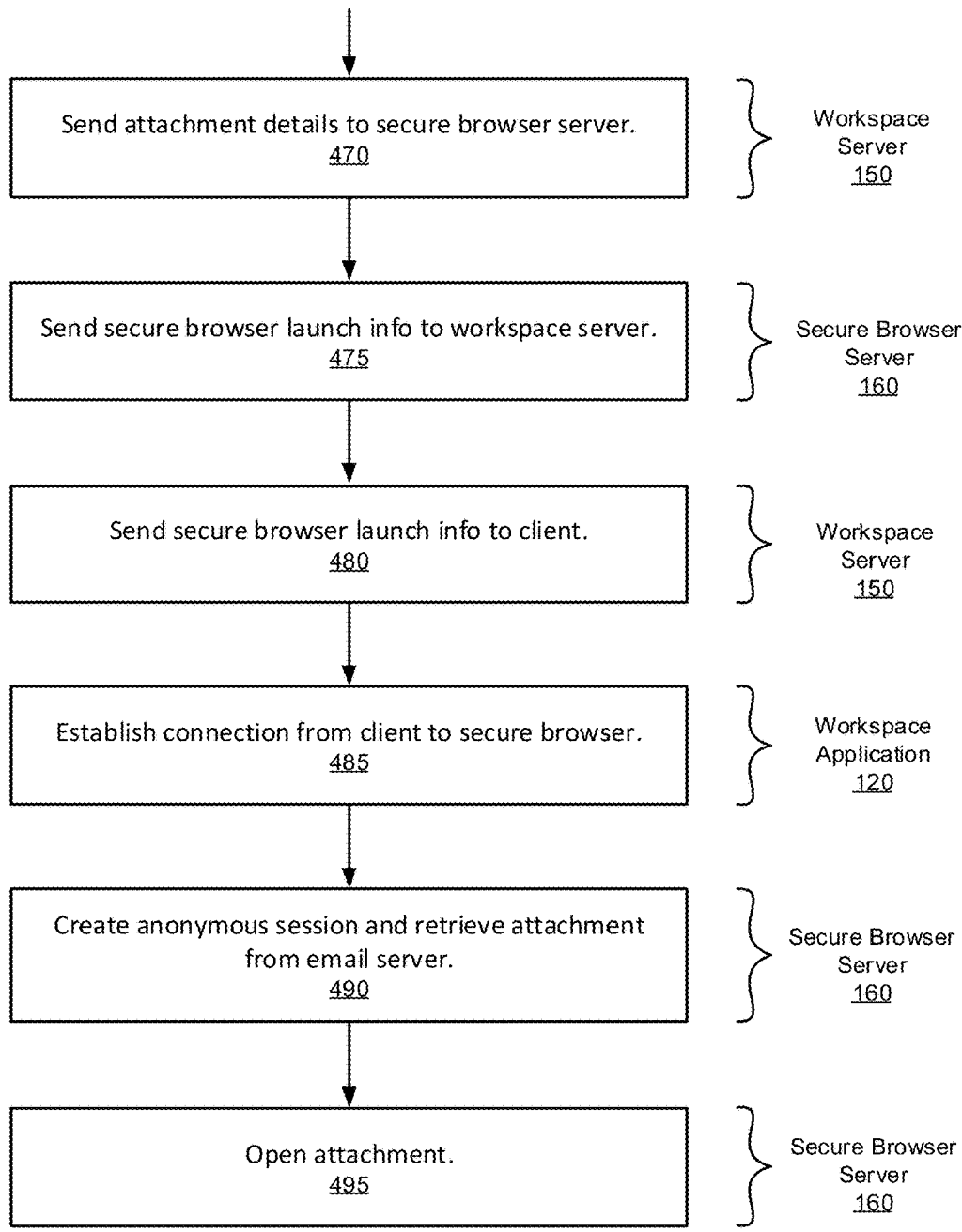

FIG. 4 is a more detailed flow diagram of a process 400 for attachment redirection, executed by system 100, of FIG. 1, or the sub-components thereof, in accordance with an example of the present disclosure. FIG. 4 is continued over three pages—FIG. 4A, FIG. 4B, and FIG. 4C.

The process 400 starts at operation 410, with the user logging into the workspace application 120, of FIG. 1, which in turn connects to the workspace server 150, of FIG. 1.

Next, at operation 415, the workspace application retrieves IT security policies from the workspace server 150. The security policies include risk and context factors directed to attachment opening decisions. In some examples, risk factors include attachment file type details (e.g., text file, Word document, PDF, spreadsheet, image, audio, etc.). For example, a plain text file (".txt" format) may be considered lower risk than a PDF file. As such an IT admin may set policies based on file extension of the attachment.

In some examples, risk factors include an address of the sender of the attachment and/or a domain name associated with the address of the sender, both of which can be ascertained after the email is accessed. The security policy may be set as a threshold value for comparison to a risk score associated with the sender of the email (e.g., provided by an analytics service).

In some examples, context includes the type of network over which the computer system receives the email (e.g., public network versus private/corporate network, Wi-Fi versus cellular, etc.). In some examples, the context includes the version of the application that is employed to open the attachment (e.g., whether it is up to date and has the latest security patches/updates).

At operation 420, the user accesses and opens email from the email server 170, of FIG. 1, through the email client 130, of FIG. 1.

At operation 425, risk factors and context associated with the email and attachment are identified.

At operation 430, the security policies are applied by the workspace application to determine if attachment redirection to the remote secure browser is required. In some examples, if the email address domain of the sender differs from the corporate address domain of the recipient, then the policies may require (or suggest) attachment redirection for secure opening. In some examples, if the email address domain of the sender is the same as the corporate address domain of the recipient, the identity of the sender may be checked with human resources to determine the risk level for the attachment. For example, if the employee is leaving the company within N days, or the employee's work record indicates some problem, then there may be a higher risk. In some examples, an analytics service may be employed to analyze the attachment to estimate a risk score and the security policy may provide a risk score threshold for comparison to decide that the attachment should be redirected for secure opening. In some examples, an analytics service may be employed to provide a risk score associated with the sender of the email.

In some examples, the security policies may specify that email delivered over a public or free Wi-Fi network is high risk and needs to be redirected. In some examples, the security policies may specify minimum acceptable version levels for applications that would be used to open the attachment.

If a decision is made to open the attachment locally (e.g., on the client), based on application of the policies to the identified risk factors and context, then the process may terminate at this point.

Otherwise, at operation 440, UI automation is employed to identify the attachment in the opened email and link event handlers to the workspace application so that attempts by the user to open the attachment are intercepted. For example, the attachment ID, index, location, coordinates, and dimensions are noted to later identify when a mouse click operation is performed within the location of the attachment. This information may be refreshed and updated as the window is updated, moved, and/or resized. In some examples, UI focus events are also setup to alert when the attachment receives focus, for example through use of the tab key which can move focus throughout the window. A mouse event handler callback is setup to notify the workspace application when the user clicks on the attachment and a keyboard event handler callback is setup to notify when the user presses enter on the attachment. Event handlers for other means of opening may also be employed (e.g., voice commands, etc.). These notifications allow the workspace application to intercept the attachment opening request and prevent the opening.

At operation 445, the user attempts to open the attachment, for example using a mouse click, keyboard entry, or other suitable means.

At operation 450, if it was previously determined that attachment redirection is not required (e.g., based on the risk evaluation) then the workspace application (or the event handlers) allows the attachment to be opened locally on the client device.

Otherwise, at operation 455, the attachment is identified and information about the attachment (e.g., the attachment ID) is sent to the workspace server.

At operation 460, execution of the secure browser add-in 140, of FIG. 1, is triggered. In some examples, the secure browser web add-in is pre-installed in the email account (e.g., by IT administration) so that the process does not rely on user installation of the add-in.

At operation 465, the secure browser add-in 140 retrieves attachment details from the email server 170 and sends those details to the workspace server 150. In some examples, attachment details include a security token and URL. At operation 470, the workspace server 150 forwards the attachment details, along with the attachment name or ID and an email ID, to the secure browser server 160, of FIG. 1.

At operation 475, the secure browser server 160 sends secure browser connection and launch information to the workspace server 150. At operation 480, the workspace server 150 forwards the connection and launch information to the client workspace application 120.

At operation 485, the workspace application 120 establishes a connection between the client and the secure browser server using the provided connection information and requests that the secure browser be launched.

At operation 490, the secure browser server 160 creates an anonymous session and retrieves the attachment (and associated metadata including format) from the email server using the attachment details (e.g., token, URL, attachment ID, and email ID).

At operation 495, the attachment is opened in the secure anonymous session. After completion with the attachment, all information associated with the anonymous session is erased so that any malicious code or data that might have been present in the attachment will not persist.

Figure 5:
FIG. 5 is a flow diagram of another process for attachment redirection, in accordance with an example of the present disclosure.

FIG. 5 is a flow diagram of another process 500 for attachment redirection, executed by client 110, of FIG. 1, or the sub-components thereof, in accordance with an example of the present disclosure.

The process 500 starts at operation 510, by evaluating the risk associated with an email attachment based on an application of security policies to properties of the attachment and to the context associated with the receipt of the email. In some examples, properties of the attachment may include one or more of an address of the sender of the attachment, a domain name associated with the address of the sender, and a file type associated with the attachment (e.g., Word document, PDF, etc.). In some examples, the context includes the type of network over which the computer system receives the email (e.g., public Wi-Fi versus private network, etc.). In some examples, the context includes the version of the application that is employed to open the attachment (e.g., whether it is up to date and has latest security updates). In some examples, the context includes a risk score associated with the sender of the email.

Next, at operation 520, an attempt to open the attachment is detected, for example using UI automation.

At operation 530, if the evaluated risk exceeds a threshold level, opening of the attachment is prevented and instead, at operation 540, the attachment is redirected to a secure browser for opening.

In some examples, the secure browser is hosted on a remote server and configured to open the attachment in a secure anonymous session.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for Attachment Redirection

Figure 6:
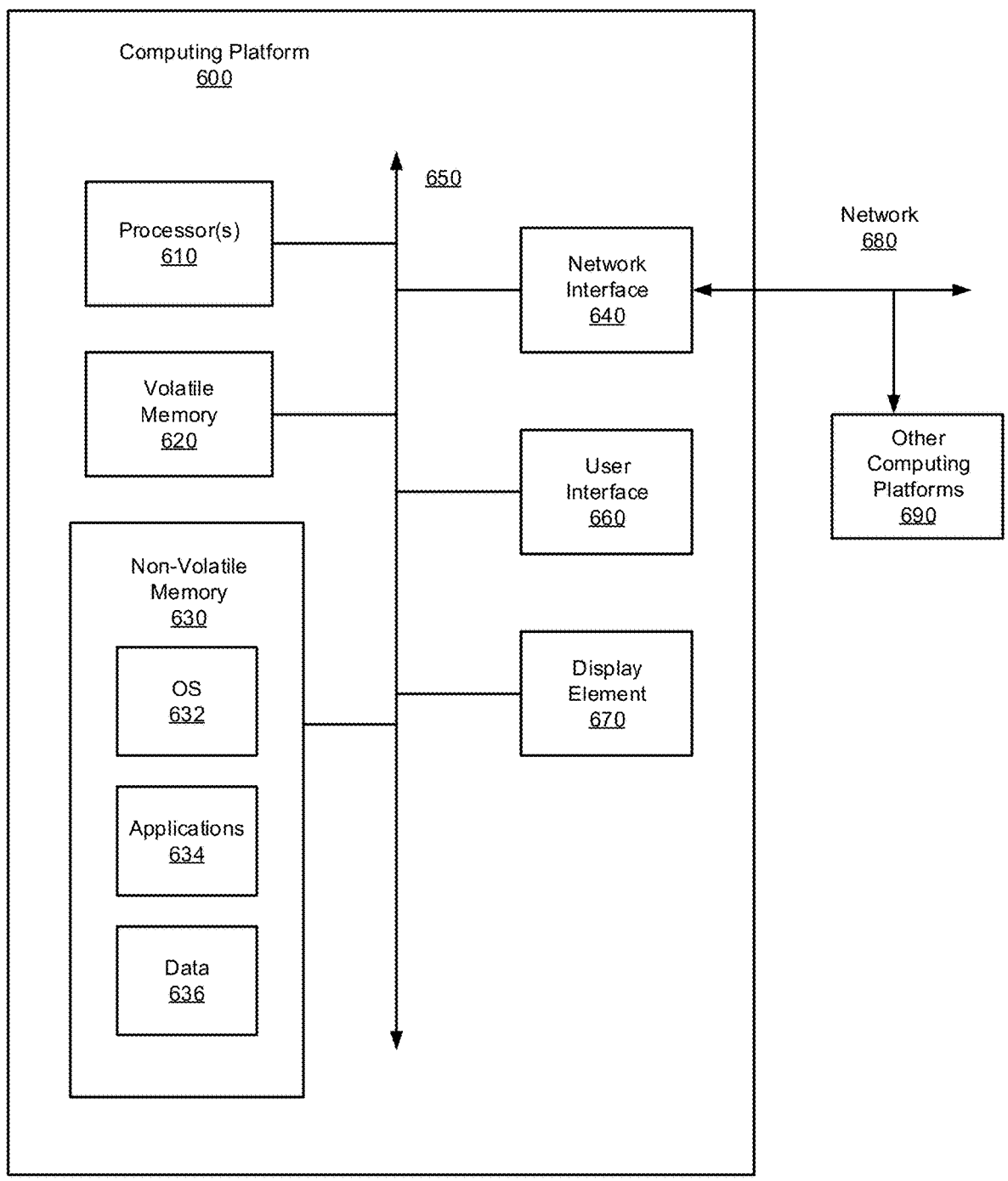
FIG. 6 is a block diagram of a computing platform configured to perform a process for attachment redirection, in accordance with an example of the present disclosure.

FIG. 6 is a block diagram of a computing platform 600 configured to perform a process for attachment redirection, in accordance with an example of the present disclosure. In some cases, the platform 600 is the client device 110, of FIG. 1, which may be a workstation, server, laptop, mobile device, or smartphone, etc.

The computing platform or device 600 includes one or more processors 610, volatile memory 620 (e.g., random access memory (RAM)), non-volatile memory 630, one or more network or communication interfaces 640, user interface (UI) 660, display element (e.g., screen) 670, and a communications bus 650. The computing platform 600 may also be referred to as a computer or a computer system.

The non-volatile (non-transitory) memory 630 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 660 can include one or more input/output (I/O) devices (e.g., a mouse, a keyboard, a microphone, one or more speakers, one or more biometric scanners, one or more environmental sensors, and one or more accelerometers, etc.).

The display element 670, can provide a graphical user interface (GUI) and in some cases, may be a touchscreen or any other suitable display device.

The non-volatile memory 630 stores an operating system 632, one or more applications 634, and data 636. The applications may include an email client 130 (including secure browser add-in 140) and workspace application 120, all of FIG. 1, such that, for example, computer instructions of the operating system 632 and applications 634 are executed by processor(s) 610 out of the volatile memory 620. In some examples, the volatile memory 620 can include one or more types of RAM and/or a cache memory that can offer a faster response time than a main memory. Data can be entered through the user interface 660. Various elements of the computer 600 can communicate via the communications bus 650.

The illustrated computing platform 600 is shown merely as an example client device or server and can be implemented by any computing or processing environment with any type of machine or set of machines that can have suitable hardware and/or software capable of operating as described herein.

The processor(s) 610 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 610 can be analog, digital, or mixed. In some examples, the processor 610 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 640 can include one or more interfaces to enable the computing platform 600 to access a computer network 680 such as a Local Area Network (LAN), a Wide Area Network (WAN), a Personal Area Network (PAN), or the Internet through a variety of wired and/or wireless connections, including cellular connections. In some examples, the network 680 may allow for communication with other computing platforms 690, to enable distributed computing.

In described examples, the computing platform 600 can execute an application on behalf of a user of a client device. For example, the computing platform 600 can execute one or more virtual machines managed by a hypervisor. Each virtual machine can provide an execution session within which applications execute on behalf of a user or a client device, such as a hosted desktop session. The computing platform 600 can also execute a terminal services session to provide a hosted desktop environment. The computing platform 600 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
a memory; and
at least one processor coupled to the memory and configured to:
evaluate a risk associated with a file attachment of an email based on application of security policies to properties of the file attachment and to context associated with receipt of the email;
detect an attempt to open the file attachment;
in response to detecting the attempt to open the file attachment, send, to a server, a request to host a secure browser session;
send, to the server, an identifier of the file attachment, an identifier of the email, and a token to authenticate a request for access to the attachment at an email server storing the file attachment;
prevent opening of the file attachment based on the evaluated risk;
communicate with the server causing the server to retrieve the file attachment using the identifier of the file attachment, the identifier of the email, and the token from the email server storing the file attachment; and
view the file attachment through the secure browser session hosted on the server.

2. The computer system of claim 1, wherein the properties of the file attachment include one or more of an address of a sender of the file attachment, a domain name associated with the sender, and a type of file associated with the file attachment.

3. The computer system of claim 2, wherein the at least one processor is further configured to check employment status of the sender of the email, wherein the properties of the file attachment further include the employment status.

4. The computer system of claim 1, wherein the context includes one or more of a type of network over which the computer system receives the email, and a risk score associated with a sender of the email.

5. The computer system of claim 4, wherein the type of network includes one or more of a public network, a private network, a wired network, a Wi-Fi network, and a cellular network.

6. The computer system of claim 1, wherein the at least one processor is further configured to employ an event handler callback to detect a mouse click or keyboard entry focused on the file attachment to detect the attempt to open the file attachment.

7. The computer system of claim 1, further comprising a remote server, wherein the secure browser is hosted on the remote server and configured to open the file attachment in an anonymous session.

8. A method for redirection of an email attachment comprising:
evaluating, by a computer system, a risk associated with a file attachment of the email based on application of security policies to properties of the file attachment and to context associated with receipt of the email;
detect, by the computer system, an attempt to open the file attachment;
in response to detecting the attempt to open the file attachment, sending, to a server, a request to create a secure browser session;
sending, to the server, an identifier of the file attachment, an identifier of the email, and a token to authenticate a request for access to the file attachment at an email server storing the file attachment;
preventing, by the computer system, opening of the file attachment based on the evaluated risk;
communicating, by the computer system, with the server causing the server to retrieve the file attachment using the identifier of the file attachment, the identifier of the email, and the token from the email server storing the file attachment; and
viewing, by the computer system, the file attachment through the secure browser session hosted on the server.

9. The method of claim 8, wherein evaluating the risk comprises evaluating the risk associated with the file attachment based on application of the security policies to properties of the file attachment including one or more of an address of a sender of the file attachment, a domain name associated with the sender, and a type of file associated with the file attachment.

10. The method of claim 9, further comprising checking employment status of the sender of the email, wherein the properties of the file attachment further include the employment status.

11. The method of claim 8, wherein evaluating the risk comprises evaluating the risk associated with the file attachment based on application of the security policies to context associated with receipt of the email including one or more of a type of network over which the computer system receives the email, and a risk score associated with a sender of the email.

12. The method of claim 8, wherein evaluating the risk comprises evaluating the risk associated with the file attachment based on application of the security policies to context associated with receipt of the email including a type of network over which the computer system receives the email, wherein the type of network includes one or more of a public network, a private network, a wired network, a Wi-Fi network, and a cellular network.

13. The method of claim 8, further comprising employing an event handler callback to detect a mouse click or keyboard entry focused on the file attachment to detect the attempt to open the file attachment.

14. A non-transitory computer readable medium storing executable sequences of instructions to provide redirection of an email attachment, the sequences of instructions comprising instructions to:
evaluate a risk associated with a file attachment of the email based on application of security policies to properties of the file attachment and to context associated with receipt of the email, the context including a version status of an application to be used to open the file attachment;
detect an attempt to open the file attachment;
in response to detecting the attempt to open the file attachment, send, to a server, a request to create a secure browser session;
send, to the server, an identifier of the file attachment, an identifier of the email, and a token to authenticate a request for access to the file attachment at an email server storing the file attachment;
prevent opening of the file attachment based on the evaluated risk;

communicate with the server causing the server to retrieve the file attachment using the identifier of the file attachment, the identifier of the email, and the token from the email server storing the file attachment; and view the file attachment through the secure browser session hosted on the server.

15. The computer readable medium of claim 14, wherein the properties of the file attachment include one or more of an address of a sender of the file attachment, a domain name associated with the sender, and a type of file associated with the file attachment.

16. The computer readable medium of claim 15, wherein the sequences of instructions further include instructions to check employment status of the sender of the email, wherein the properties of the file attachment further include the employment status.

17. The computer readable medium of claim 14, wherein the context includes one or more of a type of network over which the computer system receives the email, and a risk score associated with a sender of the email.

18. The computer readable medium of claim 17, wherein the type of network includes one or more of a public network, a private network, a wired network, a Wi-Fi network, and a cellular network.

19. The computer readable medium of claim 14, wherein the sequences of instructions further include instructions to employ an event handler callback to detect a mouse click or keyboard entry focused on the file attachment to detect the attempt to open the file attachment.

20. The computer readable medium of claim 14, wherein the secure browser is hosted on a remote server and configured to open the file attachment in an anonymous session.

* * * * *